(No Model.) 3 Sheets—Sheet 2.
E. R. E. COWELL.
CHART.

No. 515,195. Patented Feb. 20, 1894.

Witnesses:
O. F. Barthet,
J. B. Dogherty

Inventor:
Edward R. E. Cowell
By Mo. Spragne Son
Atty's.

(No Model.)

E. R. E. COWELL.
CHART.

No. 515,195.

3 Sheets—Sheet 3.

Patented Feb. 20, 1894.

Witnesses:
O. F. Barthel,
N. L. Lindop

Inventor:
Edward R. E. Cowell,
By Mc... Atty's

UNITED STATES PATENT OFFICE.

EDWARD R. E. COWELL, OF BUFFALO, NEW YORK, ASSIGNOR OF ONE-HALF TO MATILDA T. KARNES, OF SAME PLACE.

CHART.

SPECIFICATION forming part of Letters Patent No. 515,195, dated February 20, 1894.

Application filed March 6, 1893. Serial No. 464,913. (No model.)

*To all whom it may concern:*

Be it known that I, EDWARD R. E. COWELL, a citizen of the United States, residing at Buffalo, in the county of Erie and State of New York, have invented certain new and useful Improvements in Charts, of which the following is a specification, reference being had therein to the accompanying drawings.

The invention consists, first, in the combination of coincident charts superimposed, the upper chart being upon transparent material.

The invention further consists in arranging the charts of the terrestrial and celestial spheres one upon the other, the upper one being transparent and pivoted upon a common plate or base, so that they may be rotated in relation to each other.

The invention further consists in the peculiar construction, arrangement and combination of the various parts.

Figure 1:
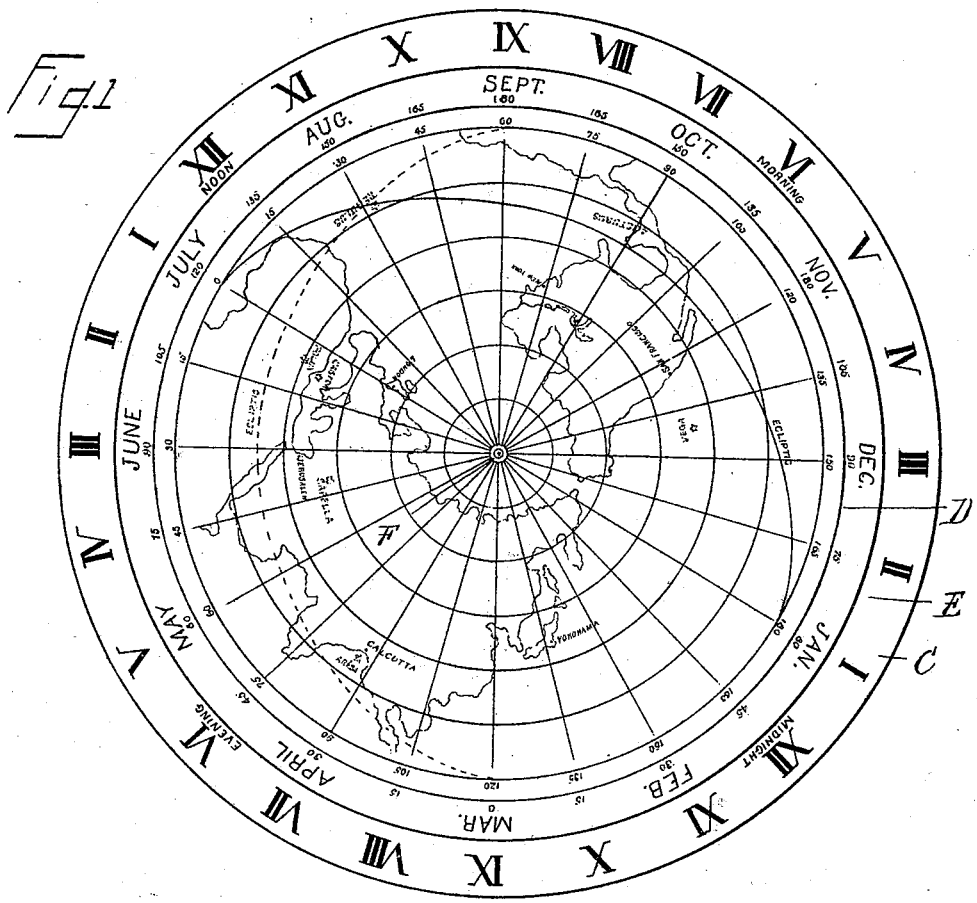
Figure 2:
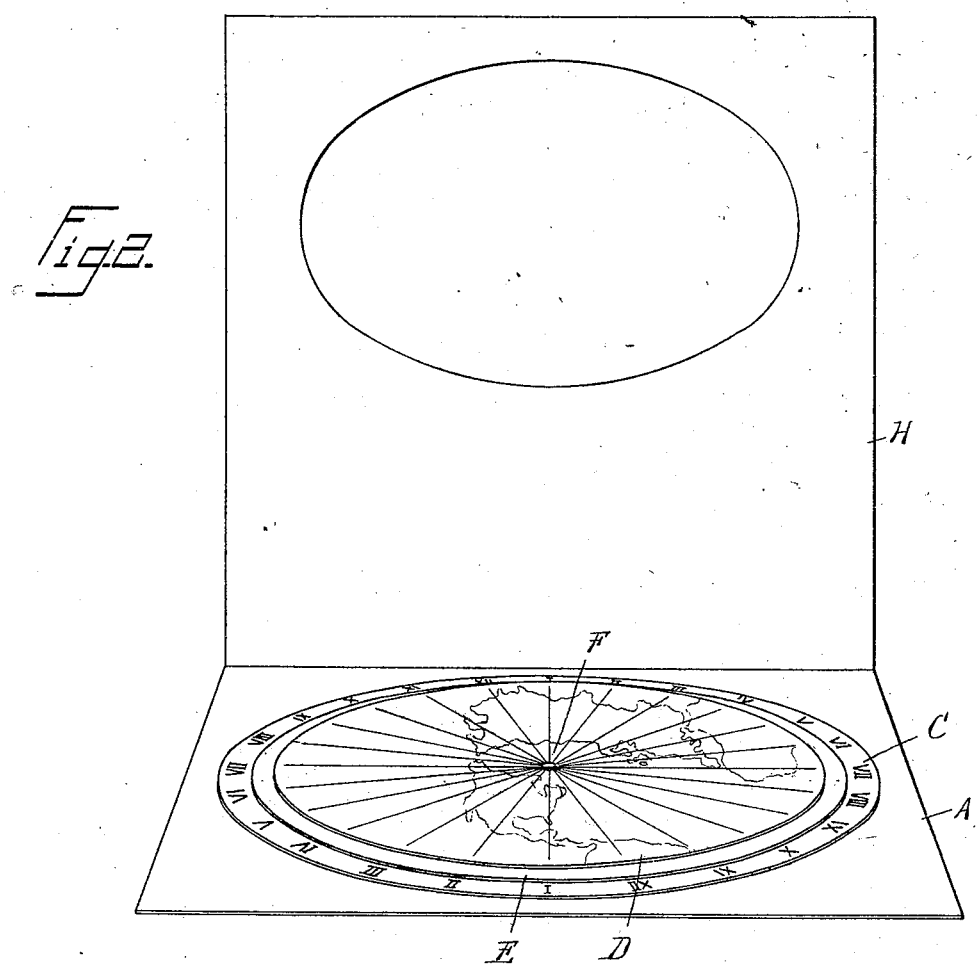
Figure 3:
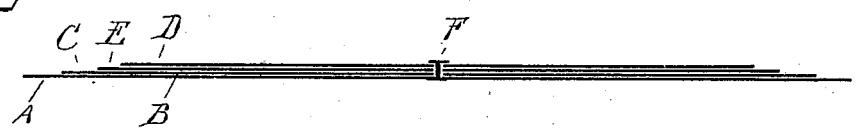
Figure 4:
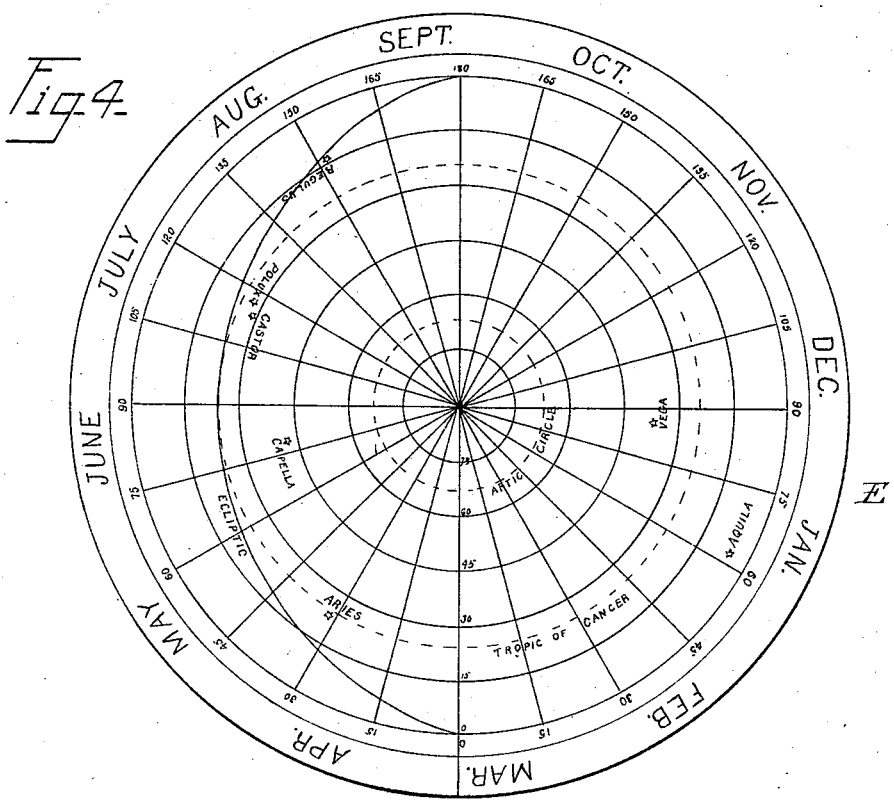

In the drawings, Figure 1 is a plan view of my chart. Fig. 2 is a perspective view thereof. Fig. 3 is an end cross section thereof. Fig. 4 is a detail view of the celestial chart.

A is a plate or base forming a support for the charts.

B is a disk thereon pivoted centrally and having at its outer edge the hours of the day marked thereon to form a time ring C.

D and E are charts respectively of the terrestrial and celestial spheres, superimposed, the upper one being of transparent material. These charts are preferably polar projections of the spheres and they are pivoted by means of a pivot F together upon the plate A so that each may be turned independently of the other. To facilitate the rotation of these disks or spheres I preferably make the under ones slightly larger than the upper ones so that the operator may rest his finger upon the projecting edges.

A chart thus constructed is of great value for teaching the relation between the terrestrial and celestial spheres illustrating the polar illumination, &c.

I preferably employ a horizon disk or plate H hinged to the plate A and having an elliptical opening therethrough, as shown in Fig. 2. When this is placed over the map and the disks turned, the rising and setting of the stars may be illustrated.

As will be seen, the charts are pivoted at the poles and rotate to show the real and apparent motion of the earth and the heavens. The map being a polar projection and the celestial sphere is shown as it would appear to an observer at the north pole. Cities having the same latitude or longitude as a star's declination will be shown on the same parallels. By placing the prime meridians together both cities and stars having the same longitude and right ascension will be on the same meridian. The charts will also show the mean solar and sidereal time. That is the rotation of the earth once in twenty four hours as marked upon the time ring will give mean time at any point on the earth. Also the rotation of the earth in sidereal time shows the time as refers to stars.

Although the charts are designed to show the parallel spheres as observed at the poles, yet by covering them with the "horizon" the rising and setting of the stars as observed at latitudes between the poles and equator, are shown. The charts may also explain the phenomena of the seasons by rotating the terrestrial sphere so that the ecliptic will cross the prime meridian thereby indicating the length of days.

What I claim as my invention is—

1. In a chart, the combination with a flat base having a time ring thereon, of a flat circular chart pivoted on the base and fitted within the time ring, and a flat transparent chart of less diameter than the other chart pivotally mounted on the base, and resting on the said other chart, substantially as described.

2. In a chart, a flat base, a flat chart pivotally mounted on the base, a transparent chart pivoted above the other chart, and a plate hinged to the base having a "horizon" thereon, and adapted to fit over the charts, substantially as described.

In testimony whereof I affix my signature in presence of two witnesses.

EDWARD R. E. COWELL.

Witnesses:
M. B. O'DOGHERTY,
N. L. LINDOP.